United States Patent
Abundis et al.

(10) Patent No.: US 7,570,399 B2
(45) Date of Patent: Aug. 4, 2009

(54) FOCAL POINT SHIFTER FOR SCANNING APPLICATIONS

(75) Inventors: Gerardo Orozco Abundis, Greeley, CO (US); Kevin J. Youngers, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1301 days.

(21) Appl. No.: 10/649,714

(22) Filed: Aug. 25, 2003

(65) Prior Publication Data

US 2005/0046911 A1    Mar. 3, 2005

(51) Int. Cl.
*H04N 1/04* (2006.01)

(52) U.S. Cl. .................... 358/497; 358/474; 359/721; 399/377; 399/378

(58) Field of Classification Search ................. 358/486, 358/497, 475; 355/75, 76; 399/378, 377; 359/721

See application file for complete search history.

(56) References Cited

U.S. PATENT DOCUMENTS

| | | | | |
|---|---|---|---|---|
| 5,359,386 A | * | 10/1994 | Rich et al. | 355/32 |
| 5,685,626 A | * | 11/1997 | Inaba | 353/120 |
| 6,169,611 B1 | * | 1/2001 | Brook et al. | 358/487 |
| 6,301,061 B1 | * | 10/2001 | Lin | 359/721 |
| 6,637,897 B2 | * | 10/2003 | Tsai et al. | 353/120 |
| 6,678,075 B1 | * | 1/2004 | Tsai et al. | 358/487 |

FOREIGN PATENT DOCUMENTS

JP        2000236422 A     8/2000

* cited by examiner

*Primary Examiner*—Kimberly A Williams

(57) ABSTRACT

A method, system, and apparatus for the shifting of a scanning device's focal point is described herein. The method, system, and apparatus comprise a focal point shifter interposed between a scanner surface and a target surface of a medium.

20 Claims, 4 Drawing Sheets

FOCAL POINT SHIFTER FOR SCANNING APPLICATIONS

FIELD OF THE INVENTION

The present invention relates to the shifting of the focal point of scanning devices.

BACKGROUND

Scanning devices, such as scanners, copiers, fax machines, or the like are designed with an intended area for scanning that depends upon the focal point of the scanner's optics. In a flatbed scanner, the intended area for scanning contains the focal point of the scanner's optics, located just above the platen, and provides an optimal area for scanning images. When typical media types, such as paper, are placed flat on the platen, the target surface is in contact with the intended scanning area and the focal point is proximate to the media's target surface. The result of putting the target surface in this optimal area is a high quality image. However, atypical media, media that may require a media holder, a template, or other such framing structure, cannot lie flat against the platen. The target surface of these objects is thus located some distance above the platen. When this situation occurs, the target surface is not in the intended area. Instead, the focal point lies in the space between the medium and the scanner platen. Because the target surface is removed from the optimal area, the resulting image may be blurry and difficult to manipulate. This problem is even more apparent when a scanning application's optics are Selfoc®, or other gradient index (GRIN) lenses. Lenses of this type are able to place the focal point of the application's optics very near the surface of scanner platens. The very short focal lengths these lenses produce, greatly exacerbate the difficulties of scanning atypical media.

For the examples of photographic slides and film negatives, the typical scanning methods will not suffice because the target surface is held off of the scanner platen surface by the media holders and/or templates used. The result is that the target surface of these media will be outside the area the designers intended to be scanned. For flatbed scanners, designers typically provide an optimal area for scanning directly on the scanner platen surface and place the focal point of the scanner's optics directly above the scanner platen. But the presence of a template and a media holder hold these atypical media off of the platen surface and cause the focal point to fall well below target surface.

SUMMARY OF THE INVENTION

Embodiments of the present invention provide a method of scanning media by interposing a focal point shifter between a surface of a scanner and target surfaces of the media. Further, embodiments of the present invention are devices for scanning media comprising a means for shifting a focal point of a scanner interposed between a surface of a scanner and a target surface. Additional embodiments of the present invention are systems for scanning media that comprise a focal point shifter interposed between a surface of a scanner and a target surface.

DETAILED DESCRIPTION

The following describes embodiments of the present invention adapted to fit the example application of a flatbed scanner and the example atypical target media of film negatives and/or photographic slides. The embodiments of the present invention, are not limited to flatbed scanners, film negatives, and photographic slides. Embodiments of the present invention could be adapted to fit any application where the focal point may need to be shifted, including, but not limited to scanners, fax machines, digitizers, copy machines, or the like.

Although typically used in conjunction with applications that optically create digital images of target media, the terms "scanner," "scanning," and "scanning device" are used here to refer to all aspects of applications that capture an image of target media including, but not limited to scanners, copiers, fax machines, digitizers, or other similar applications.

Two examples of atypical media are film negatives and photographic slides. These atypical media types are typically housed in a media holder comprised of a paper or plastic frame. To scan a film negative or a photographic slide, a scanning application is typically fitted with an apparatus to orient the media for proper scanning. For the example of a flatbed scanner, a template may be placed on the platen of the flatbed scanner to aid in the placement and orientation of the photographic slide or film negative. Media holders are typically designed to house specific media types, and templates are typically designed to house specific types of media holders. Those of ordinary skill in the art will appreciate that there exist many various methods and devices for the holding and orienting of atypical media, including but not limited to, combining a holder and template in one device. Those of ordinary skill in the art will further appreciate that the embodiments of the present invention are not limited by any specific method or arrangement, but may be easily adapted to any holder and/or template that causes a medium's target surface to be outside the optimal or intended scanning area.

Figure 1:
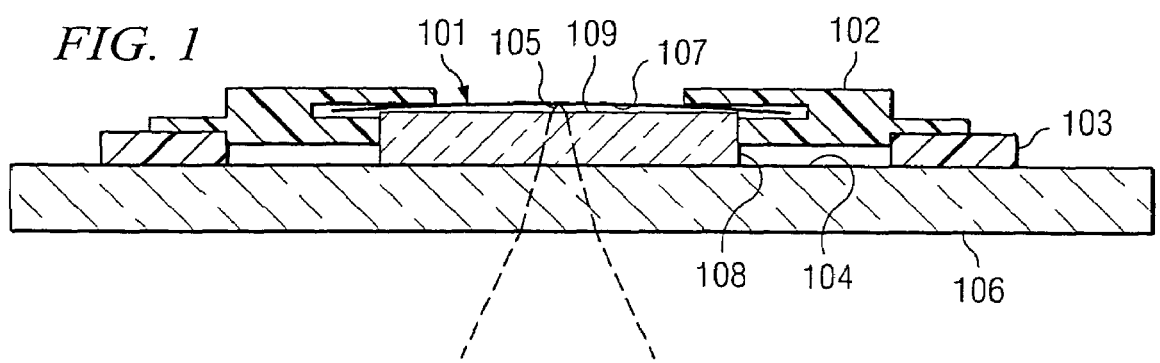
FIG. 1 depicts a cross sectional view of scanning system arranged according to embodiments of the present invention.

FIG. 1 illustrates an embodiment of the present invention that places the target surface of a scanned medium in the intended and optimal scanning area. In FIG. 1 a film negative 101 is held by media holder 102 which rests in template 103 on scanner platen surface 104. Interposed between film negative 101 and scanner platen 106 is a focal point shifter 108. Shifter 108 is composed of glass, plastic, semiconductor crystal, or other appropriate material having an index of refraction capable of shifting focal point 105 by refractively channeling it to an area just above shifter surface 109. The shifter's thickness is selected appropriately so that target surface 107 of film negative 101 is proximate to shifter surface 109. In some embodiments, the length and width of shifter 108 can be selected appropriately to fit media holder 102 and template 103 exactly, causing shifter 108 to fit into template 103 and holder 102, allowing shifter surface 109 to make contact with target surface 107. By shifting the focal point 105 to an area just above shifter surface 109, a system or apparatus would have an intended scanning area just above shifter surface 109 where the scanning of images is optimal.

Figure 2:
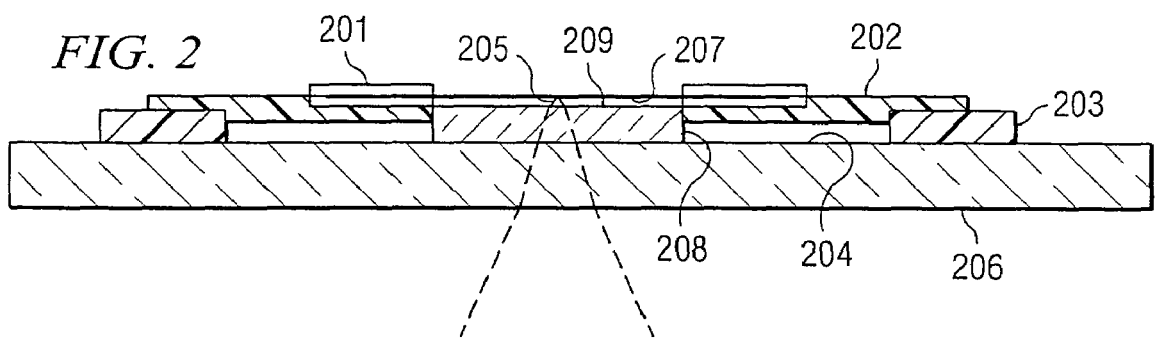
FIG. 2 depicts a cross sectional view of scanning system according to embodiments of the present invention.

FIG. 2 depicts how some embodiments may be used in conjunction with photographic slides. Shifter 208 is interposed between slide 201 and scanner platen surface 204 shifter 208 thus moves or shifts focal point 205 to be just above shifter surface 209. Since slide 201 is proximate to shifter surface 209, the shifted focal point 205 is proximate to target surface 207. Again, in some embodiments, shifter 208 is appropriately selected for size to fit inside media holder 202 and/or template 203, and target surface 207 is actually in contact with shifter surface 209. Further, while shifters 108, 208 have been described and illustrated as having a flat surface contour and an approximately rectangular shape, one of ordinary skill in the art will appreciate that the embodiments of the present invention are not limited to these shapes and contours. Rather, embodiments of shifters 108, 208 can take any shape and have any contours that are appropriate to the application and media to be scanned. For example, an embodiment may include the curving or otherwise shaping of the surface of shifter 108, 208 so that it more efficiently interfaces or matches with the scanner platen surface 104, 204, or the target surface 109, 209. Shaping shifter 108, 208 so that it acts as a lens so that the focal point of the scanner optics is further altered may also be advantageous in other embodiments.

The previous descriptions used an illustrative and generalized arrangement of media holders and templates associated with scanning atypical media. It will be appreciated by those of ordinary skill in the art, that atypical media holders and/or templates can and do take forms and have arrangements quite different than those depicted here. Other embodiments might have a shifter as an integral part of a template, so that when media holders 102, 202 are placed inside templates 103, 203, shifter surfaces 109, 209 are automatically placed proximate to target surfaces 107, 207. In this embodiment when the templates 103, 203 are removed, the shifters 108, 208 are automatically removed. Templates 103, 203 and media holders 102, 202 may vary in thickness and shape, causing the distance between target surfaces 107, 207 and scanner surfaces 104, 204 to vary widely. Techniques for insuring target surfaces 107, 207 are close enough to shifter surfaces 109, 209 can be easily adapted without undue experimentation. Further, embodiments of the present invention are not limited to photographic slides, film negatives, or any other specific media type. Those skilled in the art will appreciate that various embodiments of the present invention can be applied to all instances of focal point shifting without undue experimentation.

Figure 3:
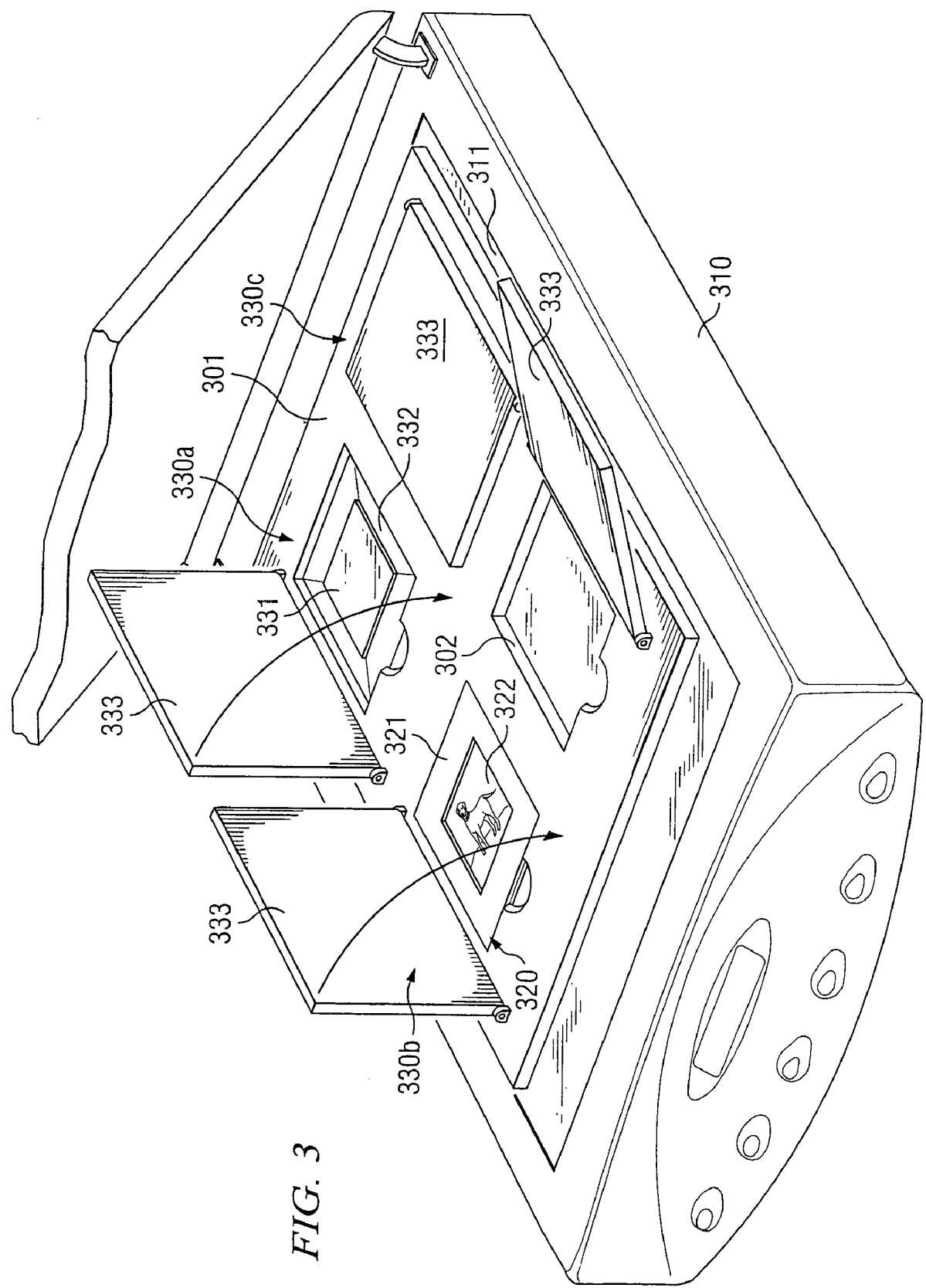
FIG. 3 depicts scanning system arranged according to embodiments of the present invention.

FIG. 3 illustrates a further embodiment using photographic slides as an example. In FIG. 3, template 301 can be placed on the scanner platen 311 of scanner 310. Template cavity 302 houses chambers, such as 330a, 330b, and 330c designed for photographic slides. The surface of chamber 330a is covered by support 332, the center of which holds optimal focal point shifter 331. Shifter 331 has been specifically shaped to fit photographic slide 320, and the top surface of shifter 331 will contact only the target surface when slide 320 has been placed in a chamber, such as in chamber 330b which provides an example of one means for orienting media. A media compression means such as lid 333 can then be used to press down on slide 320 to ensure that the target surface is as close as possible to top surface of shifter 331, as depicted by chamber 330c. The embodiment of FIG. 3 is not limited to use with photographic slides; other embodiments can be easily adapted to be used with photographs, framed objects, or other atypical media without undue experimentation.

Figure 4:
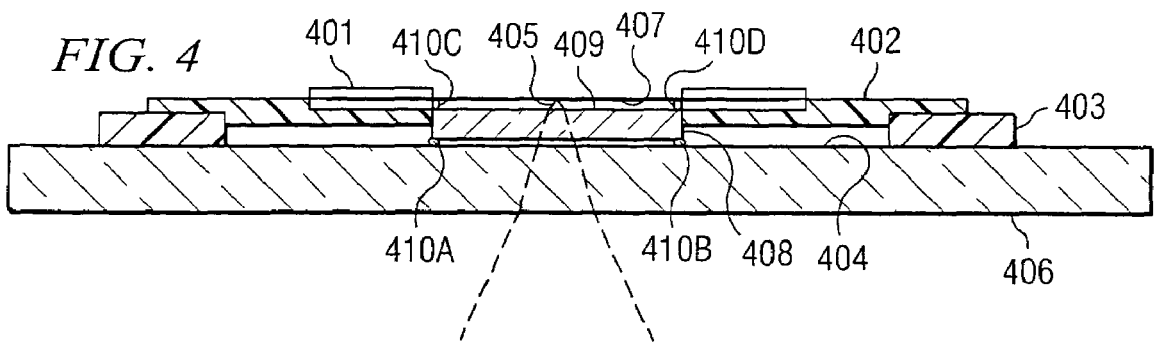
FIG. 4 depicts a cross sectional view of a scanning system arranged according to embodiments of the present invention.

When two partially transparent surfaces are placed in contact, the optical phenomenon called "Newton's Rings" may be present. These rings may interfere with effective scanning when the shifter and the scanner platen surface are not perfectly parallel. These rings may also be apparent if the shifter surface is not perfectly parallel with target surface. Some embodiments of the present invention include gaskets between the shifter and the scanner glass surface, and/or between the shifter and the target surface. FIG. 4 depicts an example placement of such gaskets 410A and 410B between the scanner platen surface 404 and shifter 408, and gaskets 410C and 410D between shifter 408 and the target surface 407.

Figure 5:
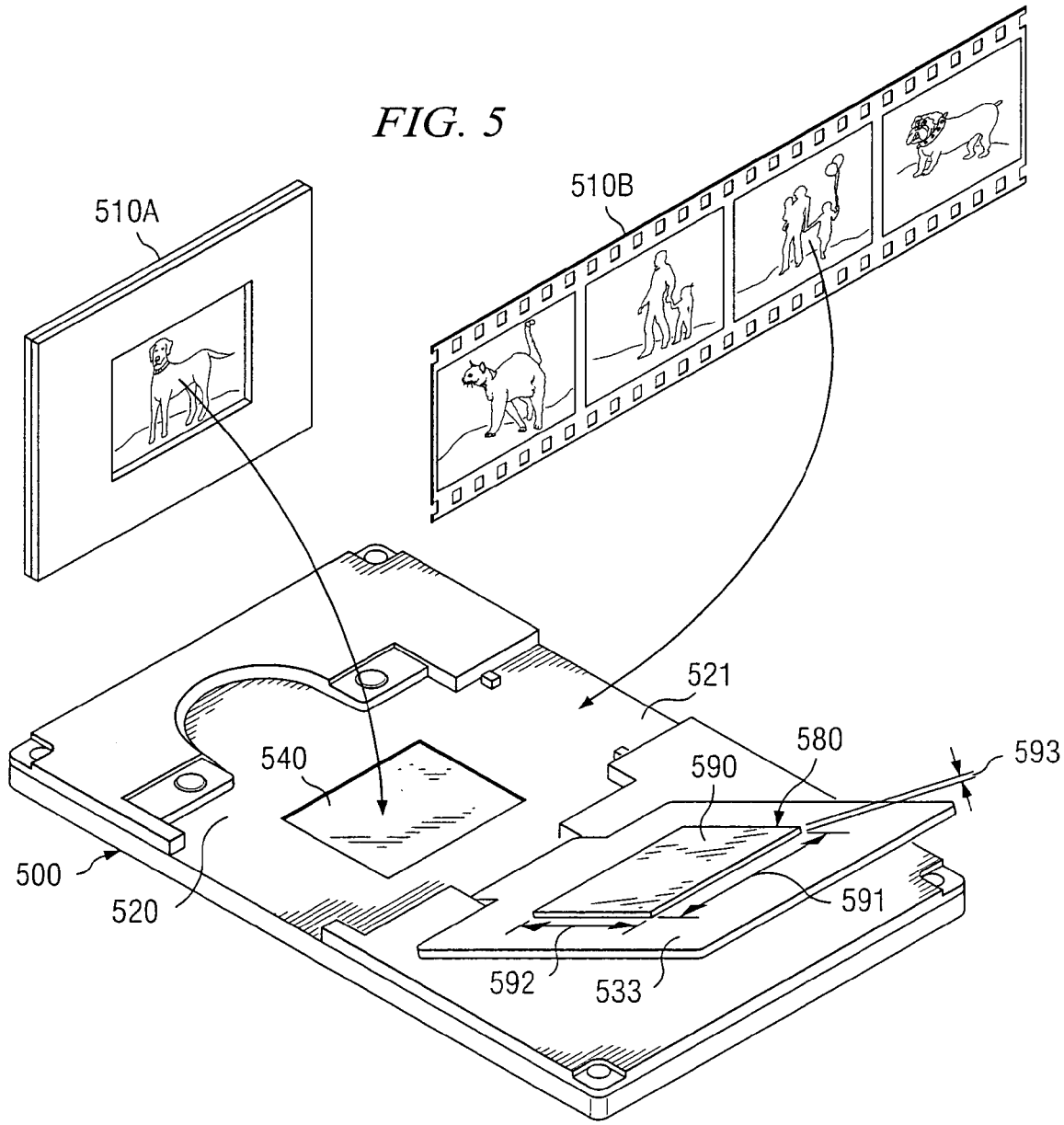
FIG. 5 depicts scanning system arranged according to embodiments of the present invention.

FIG. 5 depicts another embodiment of the present invention as viewed from one side. Apparatus 500 is capable of facilitating the scanning of both example types of atypical media in the above descriptions, photographic slide 510A and film negative 510B. Slide cavity 520 and negative cavity 521 hold their respective media in position so that when lid 533 is closed, shifter 580 is placed in the appropriate position. Backlight 540 further aids in the scanning of these media types. This embodiment uses a shifter 580 composed of glass and having an index of refraction of 1.65. In the embodiment as depicted in FIG. 5, a shifter with a thickness 593 of 1.7 mm, a width 591 of 34 mm, and a length 592 of 22 mm is appropriate to properly fit both exemplary media types. When closed, lid 533 acts as a compression means to ensure shifter surface 590 is proximate to the target surface of the selected media.

Figure 6:
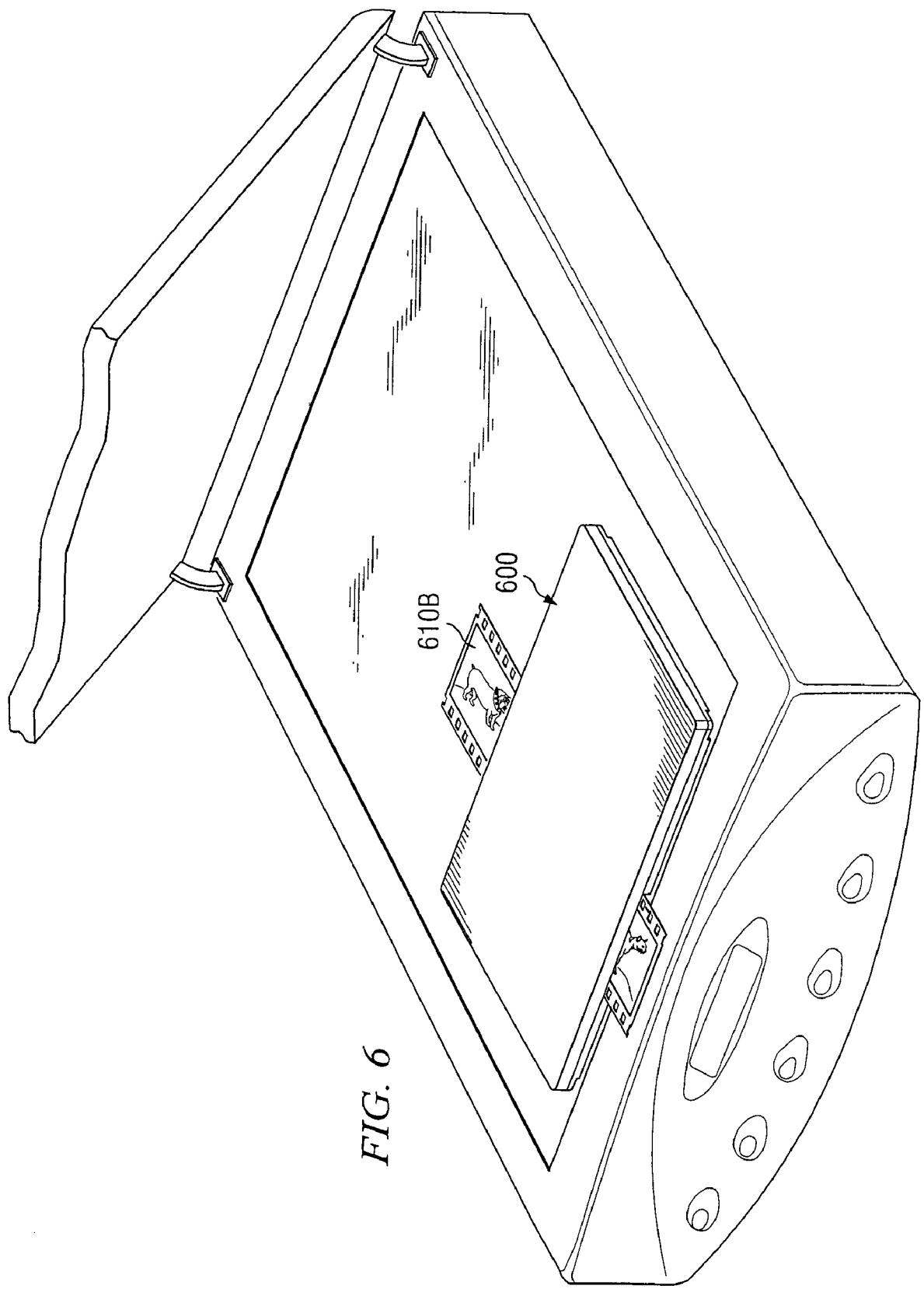
FIG. 6 depicts scanning system arranged according to embodiments of the present invention.

FIG. 6 depicts apparatus 600 as viewed from another side, and illustrates how apparatus 600 is oriented when placed on a scanner platen. When placed on a scanner platen, film negative 610B can then be scanned.

What is claimed is:

1. A method for scanning media comprising:
positioning a medium having a target surface proximate to a platen surface of a scanner;
interposing a focal point shifter between said platen surface of said scanner and said target surface; and
refractively shifting a focal point of light of the scanner from a point proximate to said scanner surface to a point proximate to said target surface.

2. The method of claim 1 further comprising:
pressing said target surface toward a first surface of said shifter.

3. The method of claim 1 further comprising:
shaping said shifter such that it operates as a lens.

4. The method of claim 1 further comprising:
maintaining a separation between said shifter and said platen surface of said scanner to minimize interference effects.

5. The method of claim 1 further comprising:
maintaining a separation between said shifter and said target surface to minimize interference effects.

6. A device for use in the scanning of media comprising:
means for shifting a focal point of a scanner, the means interposed between a scanner platen surface and a target surface located on a medium; and
means for orienting the medium to said shifting means, wherein said shifting means refractively moves the intended scanning area of a scanner from an area proximate to said scanner platen surface to an area proximate to said target surface.

7. The device of claim 6 further comprising: means for keeping said shifting means from touching the target surface.

8. The device of claim 6 further comprising:
a backlight positioned on an opposite side of said medium from said scanner platen surface.

9. The device of claim 6 wherein said shifting means is incorporated in a template.

10. The device of claim 6 further comprising:
compression means to press the target surface and said shifting means together.

11. The device of claim 6 wherein said shifting means is shaped to be slideably insertable into a media holder bringing the target surface closer to said shifting means.

12. The device of claim 6 wherein said shifting means is shaped to conform with said target surface.

13. The device of claim 6 further comprising:
means for keeping said shifting means from touching the scanner platen surface.

14. The system for scanning media comprising:
a scanner to scan a target surface of a medium; and
a focal point shifter interposed between a platen surface of the scanner and the target surface, wherein said shifter refractively moves an optimal point from a point proximate to said scanner platen surface to a point proximate to said target surface.

15. The system of claim 14 wherein said shifter is slideably insertable into a media template.

16. The system of claim 14 further comprising:
at least one gasket to prevent the shifter from maintaining contact with the scanner platen surface.

17. The system of claim 14 further comprising:
at least one gasket to prevent the shifter from maintaining contact with the target surface.

18. The system of claim 14 wherein said shifter is part of a media template.

19. The system of claim 14 further comprising:
a lid that closes over the medium pressing the target surface toward the shifter.

20. The system of claim 14 wherein a surface of said shifter is adapted to match said target surface.

* * * * *